Nov. 6, 1923.  C. R. SHORT  1,473,127
PISTON
Filed April 6, 1917
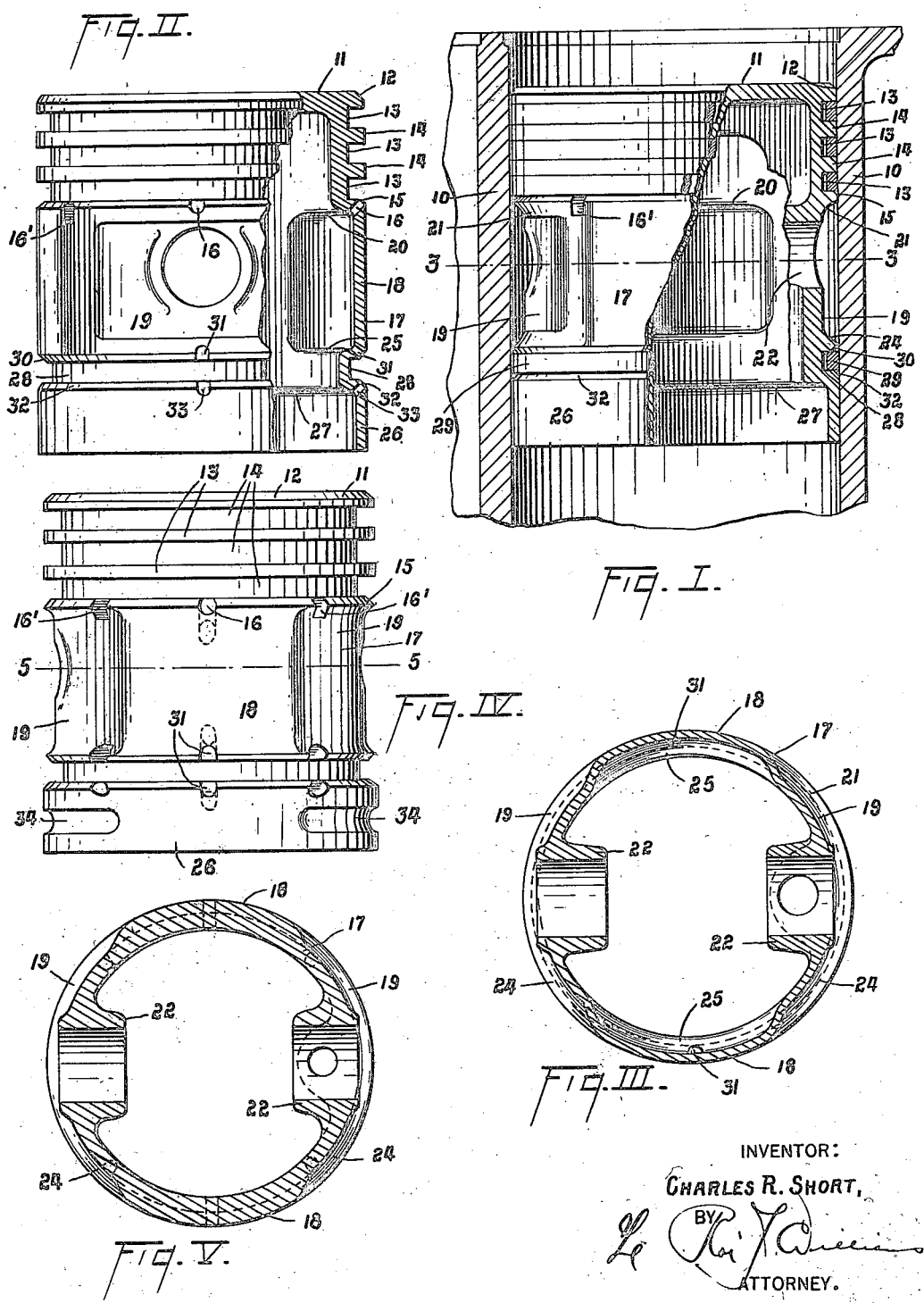
INVENTOR:
CHARLES R. SHORT,
BY
ATTORNEY.

Patented Nov. 6, 1923.

1,473,127

UNITED STATES PATENT OFFICE.

CHARLES R. SHORT, OF DETROIT, MICHIGAN, ASSIGNOR TO GENERAL MOTORS COMPANY, OF DETROIT, MICHIGAN, A CORPORATION OF NEW JERSEY.

PISTON.

Application filed April 6, 1917. Serial No. 160,130.

*To all whom it may concern:*

Be it known that I, CHARLES R. SHORT, a subject of the King of Great Britain, and resident of Detroit, Wayne County, State of Michigan, have invented certain new and useful Improvements in Pistons, of which the following is a specification.

This invention relates to hydrocarbon motors and more particularly to improvements in piston constructions, especially adapted for use therein.

One of the objects of this invention is to generally improve the construction and operation of a piston by providing a very light construction which is adequately braced or trussed, and with the metal so distributed that the tendency to distort various portions thereof by changes in temperature, is reduced to a minimum.

Another object of my invention is to provide a piston having formed exteriorly and interiorly thereof, circumferentially extending ribs or trusses.

Another object of my invention is to provide a piston with adequate means for carrying off any surplus lubricant which lodges between the piston and the cylinder wall.

With the use of previously constructed light pistons, it has been found that on account of the fact that considerably more metal is located in the side wall adjacent the piston pin bosses, difficulty has been experienced because of piston distortion and seizing of the piston in the cylinder walls, resulting from unequal expansion of the metal in various portions of the piston.

To obviate these and other difficulties, I have provided a piston in which a greater clearance is provided between the cylinder walls and that portion of the piston wall in which the boss is mounted, and by strengthening or trussing the side wall of the piston between the portions in which the bosses are formed.

Various other objects will more clearly appear from the following description, taken in connection with the accompanying drawings, which form a part of this specification and in which:

Figure 1 is a longitudinal vertical section, through a portion of a motor cylinder wall, in which is illustrated, partially in elevation and partially in section, a piston embodying a preferred form of my invention;

Figure 2 is a similar view of the piston illustrated in Figure 1, taken substantially at right angles to that view;

Figure 3 is a transverse section of the piston substantially on the line 3—3 of Figure 1;

Figure 4 is a side elevation of a modified form of my invention; and

Figure 5 is a transverse section, substantially on the line 5—5 of Figure 4.

Referring to the drawings, 10 represents the cylinder wall of a hydrocarbon motor in which may be mounted in the usual manner, a piston constructed according to my invention.

In Figures 1, 2 and 3, particularly, the piston which is preferably forged of iron or die cast of an aluminum alloy, comprises a head portion 11, having a beveled top edge 12. The side wall of this portion is formed with a plurality of ring grooves 13 between ribs 14. The lower outer edge of the lower groove is adapted to be beveled as at 15, so that when the piston moves downwardly, any surplus lubricant which has collected between the piston at this point and the cylinder wall, will be deflected into the adjacent groove from which it will be carried by the inclined channel 16 to the interior of the piston, and by a notch 16′ to a recess, which will now be described, for lubricating the piston pin.

The intermediate portion 17 of the piston may have distributed around its circumference, a plurality of pads 18 and a plurality of recesses 19. The outer surfaces of the pads are shown as formed flush with the similar surfaces of the ribs 14, and are joined at their upper ends to the head portion by inturned ribs 20. The recesses 19 are also joined to the head portion by reversely turned ribs 21.

A pair of inwardly extending bosses 22 are formed integral with the walls adjacent the recesses 19. The recesses, or grooves 19 thus provided adjacent each of the bosses, extend part way around the circumference of the intermediate portion to the pads 18. The bottom and top of these grooves are formed to provide strengthening ribs 21 and 24 respectively. Also it will be noted that the described formation of the pads 18, provides a pair of inturned strengthening ribs 20 and 25 respectively. Thus it will be seen that the intermediate portion of the piston is ribbed and grooved, either internally or externally substantially throughout its entire circumference. With this rib and groove construction, it will of course be understood that a trussing effect is produced, providing maximum strength with minimum weight.

It will also be noted that I have effected a substantially uniform distribution of metal throughout the intermediate portion of the piston, by an out-turning or inturning of the metal and minimizing any tendency to distort the piston or to cause it to seize on the cylinder wall.

The lower or skirt portion 26 of the piston is adapted to be joined with the intermediate portion by the rib 27. The skirt portion is inturned at this point as shown at 28, for forming another groove in which a ring 29 may be fitted. The upper edge of this groove may be beveled as at 30, so that when the piston travels upwardly, any surplus oil between the piston and the wall at this point will be deflected into the groove from which it may be carried to the interior of the piston, as by channels 31. The lower edge of this groove may also be beveled as at 32 for similarly deflecting oil into inclined channels 33, when the piston moves in an opposite direction.

It will also be understood that the inturning of the skirt portion 26 of the piston as at 27, not only serves to form a ring groove, but also forms a strengthening belt.

Referring more particularly to Figures 4 and 5, it is to be noted that instead of forming the various portions of the wall with reversely curved offsets with the metal of uniform thickness, the recesses 19 may be formed by merely coring out if cast, and pressing if forged, and the pads 18 are formed by merely increasing the thickness of the wall of the piston at this point. Also it will be noted that in this construction, a groove may be formed in the skirt portion 26 of the piston by machining as at 34.

While I have described and will specifically claim what I deem to be preferred forms of my invention, it will be obvious to those skilled in the art, that various modifications and changes may be made without departing from the spirit and scope hereof.

Having thus described my invention, what I desire and claim to secure by Letters Patent is:

1. A hollow piston having a head portion, a skirt portion, and an intermediate portion; said intermediate portion having two oppositely disposed external recesses surrounding openings adapted to receive the ends of a piston pin, and two pads arranged in alternation with said recesses; said intermediate portion being provided with circumferentially extending internal and external strengthening ribs connecting the same with said head and skirt portions.

2. A hollow piston having a grooved head portion, a skirt portion, and an intermediate portion; said intermediate portion having two oppositely disposed external recesses surrounding openings adapted to receive the ends of a piston pin, and two pads arranged in alternation with said recesses and the outer surfaces of which lie in and form part of the peripheral bearing surface of the piston; said intermediate portion being provided with alternately arranged circumferentially extending internal and external strengthening ribs connecting the same with said head and skirt portions, and the walls thereof being of substantially uniform thickness at all points.

3. A hollow piston having a grooved head portion, a skirt portion, and an intermediate portion; said intermediate portion having two oppositely disposed external recesses surrounding openings adapted to receive the ends of a piston pin, and two pads arranged in alternation with said recesses and the outer surfaces of which lie in and form parts of the peripheral bearing surface of the piston; said intermediate portion being provided with strengthening ribs connecting the same with said head and skirt portions, and the wall thereof being of substantially uniform thickness at all points.

4. A hollow piston the peripheral wall of which is provided with an external circumferentially extending groove, and which wall is so shaped as to provide an intermediate portion having openings adapted to receive the ends of a piston pin; said intermediate portion being provided with external recesses about said openings, and the bottom walls of which recesses are imperforate except for the openings provided for the ends of the piston pin; said peripheral wall having a plurality of passages leading from said groove and discharging some of them into said recesses, and others into the interior of the piston.

In testimony whereof I affix my signature.

CHARLES R. SHORT.